(12) United States Patent
Rodriguez

(10) Patent No.: US 6,792,509 B2
(45) Date of Patent: Sep. 14, 2004

(54) PARTITIONED CACHE OF MULTIPLE LOGICAL LEVELS WITH ADAPTIVE RECONFIGURATION BASED ON MULTIPLE CRITERIA

(75) Inventor: Jorge R. Rodriguez, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 10/005,426

(22) Filed: Nov. 7, 2001

(65) Prior Publication Data

US 2002/0156979 A1 Oct. 24, 2002

Related U.S. Application Data

(63) Continuation-in-part of application No. 09/838,607, filed on Apr. 19, 2001, and a continuation-in-part of application No. 09/838,433, filed on Apr. 19, 2001.

(51) Int. Cl.[7] .............................................. G06F 12/00
(52) U.S. Cl. ....................... 711/129; 711/141; 711/153; 711/167; 711/203
(58) Field of Search ................................ 711/129, 141, 711/153, 167, 203

(56) References Cited

U.S. PATENT DOCUMENTS 4,503,501 A    3/1985  Coulson et al. ............. 364/300
4,807,224 A    2/1989  Naron et al. ................. 370/94

(List continued on next page.)

OTHER PUBLICATIONS

"Class of Broadcast Protocols for File Transfers to Multiple Sites," *IBM Technical Disclosure Bulletin*, vol. 24, No. 1B, Jun. 1981, pp. 780–782.

Soha, Michael. "A Distributed Approach to Lan Monitoring Using Intelligent High Performance Monitors," *IEEE Network*, vol. 1, No. 3, Jul. 1987, pp. 13–20.

Whitehorn, Mark. "Monitoring the Expanding Enterprise Network," *Telecommunications*, vol. 28, No. 10, Oct. 1994, pp. 7, 65, 102.

Taguchi, T. "Sniffer Network Management System, Network General Co., " *Data Communication and Processing*, vol. 23, No. 9, Sep. 1991, pp. 53–57.

"Parallel Data Partitioning of Shared Memory Computers Using Fetch and Add with Block Transfers," *IBM Technical Disclosure Bulletin*, vol. 31, No. 1, Jun. 1988, pp. 348–351.

*Primary Examiner*—Reba I. Elmore
(74) *Attorney, Agent, or Firm*—Winstead, Sechrest & Minick

(57) ABSTRACT

A system, computer program product and method for reallocating memory space for storing a partitioned cache. A server may be configured to receive requests to access a particular logical drive. One or more logical drives may be coupled to an adapter. A plurality of adapters may be coupled to the server. Each logical drive may be associated with one or more stacks where each stack may comprise one or more cache entries for storing information. The one or more stacks associated with a logical drive may be logically grouped into a logically grouped stack associated with that logical drive. Each of the logically grouped stacks of the one or more logical drives coupled to an adapter may be logically grouped into a logically grouped stack associated with that adapter. By logically grouping stacks, memory supporting a partitioned cache may adaptively be reallocated in response to multiple criteria thereby improving the performance of the cache.

24 Claims, 11 Drawing Sheets

U.S. PATENT DOCUMENTS

| | | | | |
|---|---|---|---|---|
| 5,043,885 A | | 8/1991 | Robinson | 364/200 |
| 5,086,428 A | | 2/1992 | Perlman et al. | 370/94.1 |
| 5,109,384 A | | 4/1992 | Tseung | 371/32 |
| 5,216,675 A | | 6/1993 | Melliar-Smith et al. | 371/32 |
| 5,394,531 A | * | 2/1995 | Smith | 711/136 |
| 5,434,992 A | * | 7/1995 | Mattson | 711/119 |
| 5,519,704 A | | 5/1996 | Farinacci et al. | 370/85.13 |
| 5,537,635 A | * | 7/1996 | Douglas | 711/129 |
| 5,649,153 A | | 7/1997 | McNutt et al. | 395/445 |
| 5,717,893 A | | 2/1998 | Mattson | 395/456 |
| 5,737,750 A | | 4/1998 | Kumar et al. | 711/129 |
| 5,751,993 A | | 5/1998 | Ofek et al. | 395/463 |
| 5,790,772 A | | 8/1998 | Badovinatz et al. | 395/182.02 |
| 5,799,146 A | | 8/1998 | Badovinatz et al. | 395/182.02 |
| 5,802,263 A | | 9/1998 | Dittmar et al. | 395/182.02 |
| 5,822,562 A | | 10/1998 | Dahlen et al. | 395/497.01 |
| 5,892,937 A | | 4/1999 | Caccavale | 395/462 |
| 6,012,126 A | | 1/2000 | Aggarwal et al. | 711/133 |
| 6,067,608 A | | 5/2000 | Perry | 711/203 |
| 6,105,103 A | | 8/2000 | Courtright, II et al. | 711/1 |
| 6,145,056 A | | 11/2000 | Heydon et al. | 711/129 |
| 6,195,731 B1 | * | 2/2001 | Bordaz et al. | 711/147 |
| 6,539,464 B1 | * | 3/2003 | Getov | 711/170 |
| 2002/0156980 A1 | * | 10/2002 | Rodriguez | 711/136 |
| 2002/0194432 A1 | * | 12/2002 | Rodriguez | 711/136 |

* cited by examiner

PARTITIONED CACHE OF MULTIPLE LOGICAL LEVELS WITH ADAPTIVE RECONFIGURATION BASED ON MULTIPLE CRITERIA

CROSS REFERENCE TO RELATED APPLICATIONS

This application is a continuation-in-part of application Ser. No. 09/838,607, entitled "Designing a Cache Using a Canonical LRU-LFU Array" filed on Apr. 19, 2001 and application Ser. No. 09/838,433, entitled "Designing a Cache with Adaptive Reconfiguration" filed on Apr. 19, 2001.

TECHNICAL FIELD

The present invention relates to the field of cache design, and more particularly to adaptively allocating memory to support a partitioned cache of multiple logical levels enabling the cache to be adaptive to multiple criteria thereby improving the performance of the cache.

BACKGROUND INFORMATION

A network server, e.g., file server, database server, web server, may be configured to receive a stream of requests from clients in a network system to read from or write to a particular logical drive in an array of logical drives such as a Redundant Array of Independent Logical drives (RAID). These requests may form what is commonly referred to as a "workload" for the network server. That is, a workload may refer to the requests that need to be serviced by the network server.

Typically, a server in a network system may comprise a network interface controller configured to interface the server with an array of logical drives, e.g., RAID, via adapters, e.g., RAID adapters, coupled to one or more logical drives in the array of logical drives. A server may be configured to create a cache in its main memory, e.g., Random Access Memory (RAM), to increase the speed of accessing data. A cache is faster than a logical drive and thereby allows data to be read at higher speeds. Thus, if data is stored in the cache it may be accessed at higher speeds than accessing the data on a logical drive.

There have been many methods in designing caches that seek to increase the cache hit rate thereby improving performance of the cache. A "cache hit" is said to occur if an item, e.g., data, requested by the processor in the server or a client in a network system, is present in the cache. When an item, e.g., data, requested by the processor in the server or a client in the network system, is not present in the cache, a "cache miss" is said to occur. A "cache hit rate" may refer to the rate at which cache hits occur. By improving the cache hit rate, the performance of the system may be improved, i.e., less data needs to be serviced from the logical drive.

One method to improve the performance of a cache is commonly referred to as the Least Recently Used (LRU) replacement method as illustrated in FIG. 1. The LRU replacement method uses a single stack 101 comprising a set of cache entries where each cache entry stores particular data. As stated above, if an item, e.g., data, requested by the processor in the server or client in a network system is present in the cache, a "cache hit" is said to occur. When a cache hit occurs, the cache entry comprising the information, e.g., data, requested moves to the first stack position as illustrated in FIG. 1. As stated above, if an item, e.g., data, requested by the processor in the server or client in a network system is not present in the cache, a "cache miss" is said to occur. When a cache miss occurs, the requested item is retrieved from the logical drive and then stored in the first stack position as illustrated in FIG. 1. When a new entry is inserted in stack 101, the cache entry in the last stack position of stack 101 is evicted. The information, e.g., data, may subsequently be discarded.

Another method to improve the performance of a logical drive cache is commonly referred to as the Segmented LRU (S-LRU) replacement method as illustrated in FIG. 2. The S-LRU replacement method may use two stacks 201A–B. Each stack, stack 201A–B, may comprise a set of cache entries where each cache entry stores particular data. When a cache hit occurs in the first stack, e.g., stack 201A, the cache entry comprising the information, e.g., data, requested moves up to the first stack position of the second stack, e.g., stack 201B, as illustrated in FIG. 2. When a new entry is added to stack 201B, the cache entry at the last stack position of stack 201B is evicted to the first stack position of stack 201A. When a new entry is inserted in stack 201A, the cache entry at the last stack position of stack 201A is evicted. The information, e.g., data, may subsequently be discarded. When a cache hit occurs in the second stack, e.g., stack 201B, the cache entry comprising the information, e.g., data, requested moves up to the first stack position of that stack, e.g., stack 201B, as illustrated in FIG. 2. When a new entry is inserted in stack 201B, the cache entry at the last stack position of stack 201B is evicted to the first stack position of stack 201A. When a new entry is inserted in stack 201A, the cache entry at the last stack position of stack 201A is evicted. When a cache miss occurs, the requested item is retrieved from the logical drive and then stored in the first stack position of the first stack, e.g., stack 201A, as illustrated in FIG. 2. When a new entry is inserted in stack 201A, the cache entry at the last stack position of stack 201A is evicted. The information, e.g., data, may subsequently be discarded.

Unfortunately, these methods of cache design focus on static techniques instead of adaptive techniques. For example, the length of the stacks in these caches do not adapt, i.e., change in size, to changes in the request stream, i.e., the workload. By designing a cache based on adaptive techniques, the cache hit rate may be improved. Furthermore, these methods do not design a cache that is adaptive based on multiple criteria, e.g., workload, physical characteristics of the network system such as the number of adapters or logical drives in the array of logical drives. Consequently, these methods do not efficiently use memory space thereby providing a need to improve the performance of the cache.

It would therefore be desirable to adaptively allocate memory to support a cache of multiple logical levels enabling the cache to be adaptive to multiple criteria, e.g., physical characteristics of the system, workload, thereby improving the performance of the cache, i.e., improving the cache hit rate.

SUMMARY

The problems outlined above may at least in part be solved in some embodiments by logically grouping the stacks associated with a logical drive into a particular logical grouping. A network server, e.g., file server, database server, web server, may be configured to receive a stream of requests from clients in a network system to read from or write to a particular logical drive in an array of logical drives that comprise a Redundant Array of Independent Logical drives (RAID). Each logical drive may be coupled to an adapter, e.g., RAID adapter, which may be coupled to the network server. That is, each adapter may be coupled to one or more logical drives. Each of the logically grouped stacks of the one or more logical drives coupled to an adapter may be logically grouped into a logically grouped stack associated with that adapter. By logically grouping stacks into further logical groupings, memory supporting a partitioned cache of multiple logical levels may be allocated adaptively in response to multiple criteria, e.g., physical characteristics of the system, workload, thereby improving the performance of the cache, i.e., improving the cache hit rate.

In one embodiment of the present invention, a method for reallocating memory space for storing a partitioned cache may comprise the step of allocating a portion of memory to store a plurality of partitions. A partition may refer to a segment of memory space in memory configured to store a stack comprising one or more cache entries where each cache entry may store information, e.g., data. Each stack may be configured to store information in a particular range of logical block addresses associated with a particular logical drive in an array of logical drives that comprise a Redundant Array of Independent Logical drives (RAID). Each particular logical drive may be coupled to a particular adapter, e.g., RAID adapter. That is, an adapter, e.g., RAID adapter, may be coupled to one or more logical drives. A plurality of adapters may then be coupled to a server configured to receive requests to retrieve information, e.g., data, from a particular logical drive. The server may further be configured to retrieve the requested information from the particular logical drive via an adapter coupled to the requested logical drive.

Each stack associated with a particular logical drive may be logically grouped into a logically grouped stack associated with the particular logical drive. As stated above, an adapter, e.g., RAID adapter, may be coupled to one or more logical drives. Subsequently, the logically grouped stacks associated with the one or more logical drives coupled to an adapter may be logically grouped into a logically grouped stack associated with that adapter. As stated above, a plurality of adapters may be coupled to a server configured to receive requests to retrieve information, e.g., data, from a particular logical drive at a particular logical block address.

A determination may be made as to which logically grouped stack associated with each adapter had the highest hit count and which logically grouped stack associated with each adapter had the lowest hit count during a particular interval of time.

The determination as to which logically grouped stack associated with each adapter had the highest hit count and which logically grouped stack associated with each adapter had the lowest hit count during a particular interval of time may comprise the step of tracking the number of cache hits in one or more particular stack positions in each logically grouped stack associated with each particular adapter. The number of cache hits in each of the one or more stack positions tracked in each particular logically grouped stack during a particular interval of time may then be counted. The number of cache hits counted in each of the one or more stack positions tracked in each particular logically grouped stack may then be added. The number of cache hits counted in the one or more stack positions, e.g., last four positions, tracked during a particular interval of time in each particular logically grouped stack may be summed by adders. The output of the adders is inputted to a comparison unit configured to determine which logically grouped stack had the highest hit count in the one or more stack positions tracked and which logically grouped stack had the lowest hit count in the one or more stack positions tracked during a particular period of time.

Upon determining which logically grouped stack had the highest hit count in the one or more stack positions tracked and which logically grouped stack had the lowest hit count in the one or more stack positions tracked during a particular period of time, the memory allocated for storing the logically grouped stack with the highest hit count may gain a block of memory while the memory allocated for storing the logically grouped stack with the lowest hit count may lose a block of memory. These reallocations determined by the comparison unit may be stored in memory.

A determination may then be made as to which logically grouped stack associated with each logical drive coupled to the adapter whose allocated memory is to gain a block of memory is to gain that block of memory, i.e., which logically grouped stack associated with a logical drive has the highest cache hit count. A further determination may be made as to which logically grouped stack associated with each logical drive coupled to the adapter whose allocated memory is to lose a block of memory is to lose that block of memory, i.e., which logically grouped stack associated with a logical drive has the lowest cache hit count. It is noted that even though the following describes which logical drive associated with the adapter determined to gain a block of memory is to gain that block of memory that the following description may apply to determining which logical drive associated with the adapter determined to lose a block of memory is to lose that block of memory.

The determination as to which logically grouped stack associated with each logical drive coupled to the adapter whose allocated memory is to gain a block of memory is to gain that block of memory may comprise the step of tracking the number of cache hits in one or more particular stack positions in each logically grouped stack associated with each logical drive coupled to the adapter whose allocated memory is to gain a block of memory. The number of cache hits in each of the one or more stack positions tracked in each particular logically grouped stack during a particular interval of time may then be counted. The number of cache hits counted in each of the one or more stack positions tracked in each particular logically grouped stack may then be added. The number of cache hits counted in the one or more stack positions, e.g., last four positions, tracked during a particular interval of time in each particular logically grouped stack associated with each logical drive may be summed by adders. The output of the adders is inputted to a comparison unit configured to determine which logically grouped stack associated with each logical drive had the highest hit count in the one or more stack positions tracked.

Upon determining which logically grouped stack associated with each logical drive coupled to the adapter whose allocated memory is to gain a block of memory is to gain that block of memory, the memory allocated for storing the logically grouped stack associated with the particular logical drive with the highest hit count may gain a block of memory. This reallocation determined by the comparison unit may be stored in memory.

A determination may then be made as to which stack associated with the logical drive determined to gain a block of memory is to gain that block of memory, i.e., which logically grouped stack associated with a logical drive has the highest cache hit count. A further determination may be made as to which stack associated with the logical drive determined to lose a block of memory is to lose that block of memory, i.e., which logically grouped stack associated with a logical drive has the lowest cache hit count. It is noted that even though the following describes which stack associated with the logical drive determined to gain a block of memory is to gain that block of memory that the following description may apply to determining which stack associated with the logical drive determined to lose a block of memory is to lose that block of memory.

The determination as to which stack associated with the logical drive determined to gain a block of memory is to gain that block of memory may comprise the step of tracking the number of cache hits in one or more particular stack positions in each stack associated with the logical drive determined to gain a block of memory. The number of cache hits in each of the one or more stack positions tracked in each stack during a particular interval of time may then be counted. The number of cache hits counted in each of the one or more stack positions tracked in each stack may then be added. The number of cache hits counted in the one or more stack positions, e.g., last four positions, tracked during a particular interval of time in each stack associated with the logical drive to gain a block of memory may be summed by adders. The output of the adders is inputted to a comparison unit configured to determine which stack associated with the logical drive to gain a block of memory had the highest hit count in the one or more stack positions tracked.

Upon determining which stack associated with the logical drive to gain a block of memory had the highest hit count in the one or more stack positions tracked during a particular interval of time, the memory allocated for storing the stack with the highest hit count may gain a block of memory. The memory storing the partitioned cache may then be reallocated accordingly. That is, the memory storing the partitioned cache may adaptively reallocate such as by allocating an additional block of memory for the stack with the highest count. The memory storing the partitioned cache may also adaptively reallocate such as by eliminating a block of memory for the stack with the lowest hit count associated with the logical drive coupled to the adapter to lose a block of memory.

Upon reallocating the memory storing the partitioned cache, the memory may be further reallocated by repeating the above determination steps.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
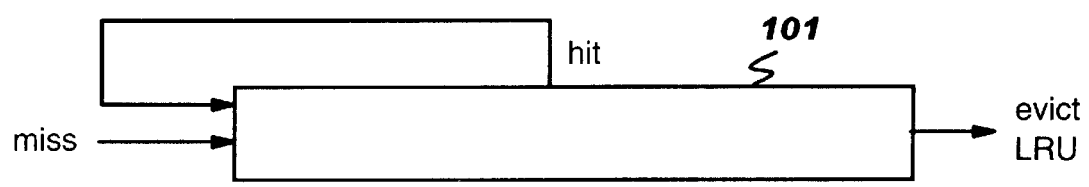
FIG. 1 illustrates an embodiment of the Least Recently Used replacement method for designing a cache.
Figure 2:
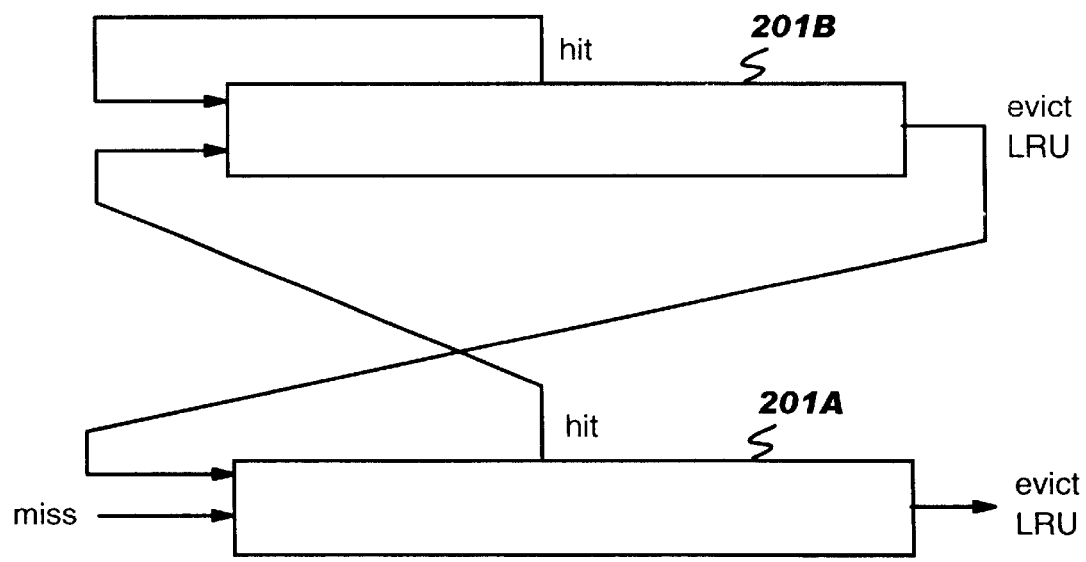
FIG. 2 illustrates an embodiment of the Segmented Least Recently Used replacement method for designing a cache.
Figure 3:
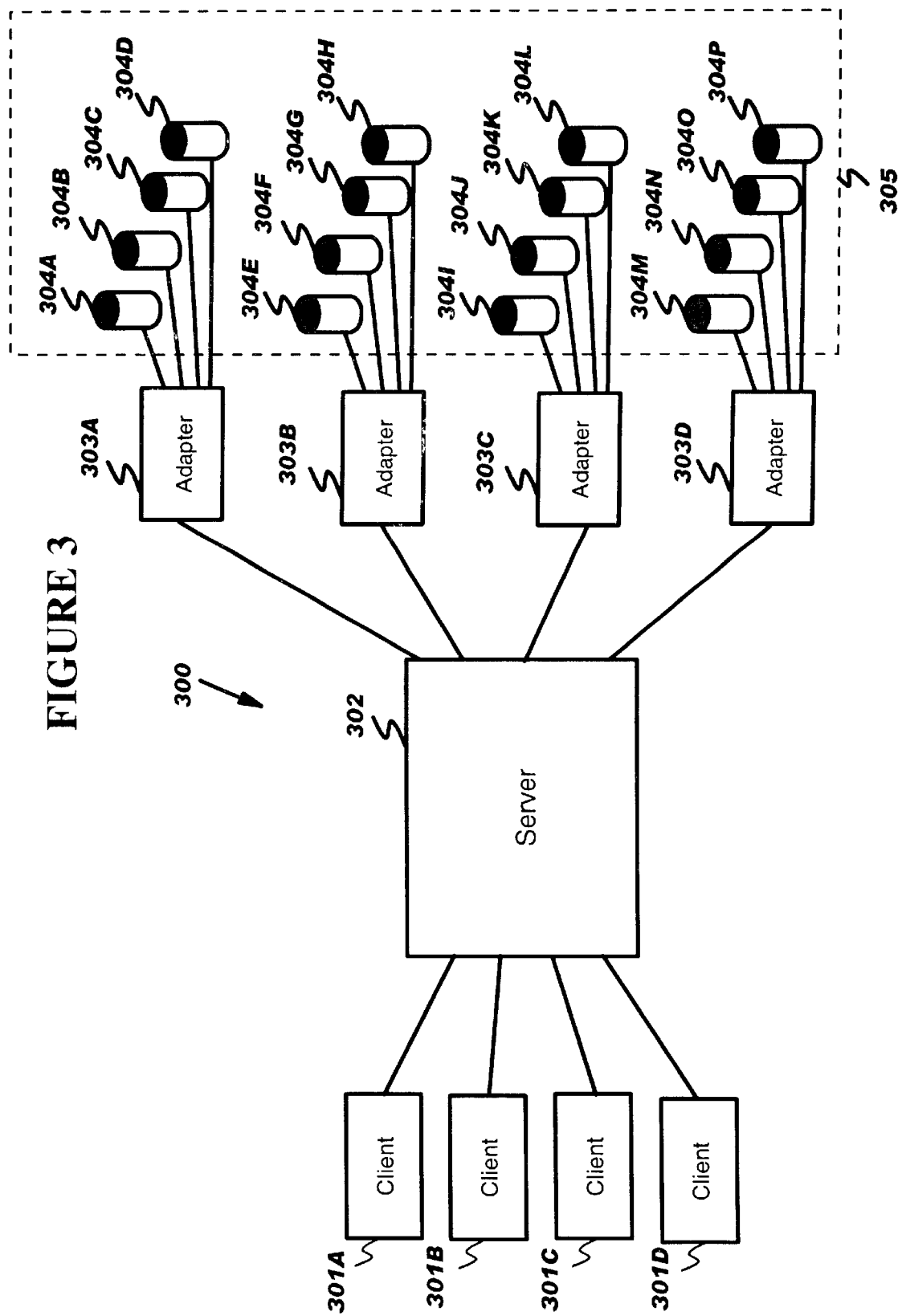
FIG. 3 illustrates an embodiment of a network system configured in accordance with the present invention.

FIG. 3—Network System

FIG. 3 illustrates one embodiment of the present invention of a network system 300. Network system 300 may comprise one or more clients 301A–D coupled to a server 302, e.g., file server, database server, web server. Server 302 may be coupled to an array of logical drives 304A–P that comprise a Redundant Array of Independent Logical drives (RAID) 305 via adapters 303A–D, e.g., RAID adapters. Clients 301A–D may collectively or individually be referred to as clients 301 or client 301, respectively. Adapters 303A–D may collectively or individually be referred to as adapters 303 or adapter 303, respectively. Logical drives 304A–P may collectively or individually be referred to as logical drives 304 or logical drive 304, respectively. Each client 301 may be configured to issue requests to server 302 to read from or write to a particular Logical Block Address (LBA) in a particular logical drive 304 in an array of logical drives, e.g., RAID. Each logical drive 304 may be configured to store information, e.g., data, within a range of LBA's. Server 302 may be configured to retrieve the requested information, e.g., data, from the requested logical drive 304 via adapter 303. Each adapter 303 may be coupled to one or more logical drives 304. For example, referring to FIG. 3, adapter 303A may be coupled to logical drives 304A–D. Adapter 303B may be coupled to logical drives 304E–H. Adapter 303C may be coupled to logical drives I–L. Adapter 303D may be coupled to logical drives M–P. Consequently, adapter 303A may be capable of servicing requests with a range of LBA's that covers the range of LBA's for logical drives 304A–D. Similarly, adapter 303B may be capable of servicing requests with a range of LBA's that covers the range of LBA's for logical drives 304E–H. Adapter 303C may be capable of servicing requests with a range of LBA's that covers the range of LBA's for logical drives 304I–L. Adapter 303D may be capable of servicing requests with a range of LBA's that covers the range of LBA's for logical drives 304M–P. It is noted that system 300 may comprise any number of clients 301, adapters 303 and logical drives 304 and that FIG. 3 is illustrative. It is further noted that network system 300 may be any type of system such as a file system or a database system and that FIG. 3 is not to be limited in scope to any one particular embodiment.

FIG. 4—Server

Figure 4:
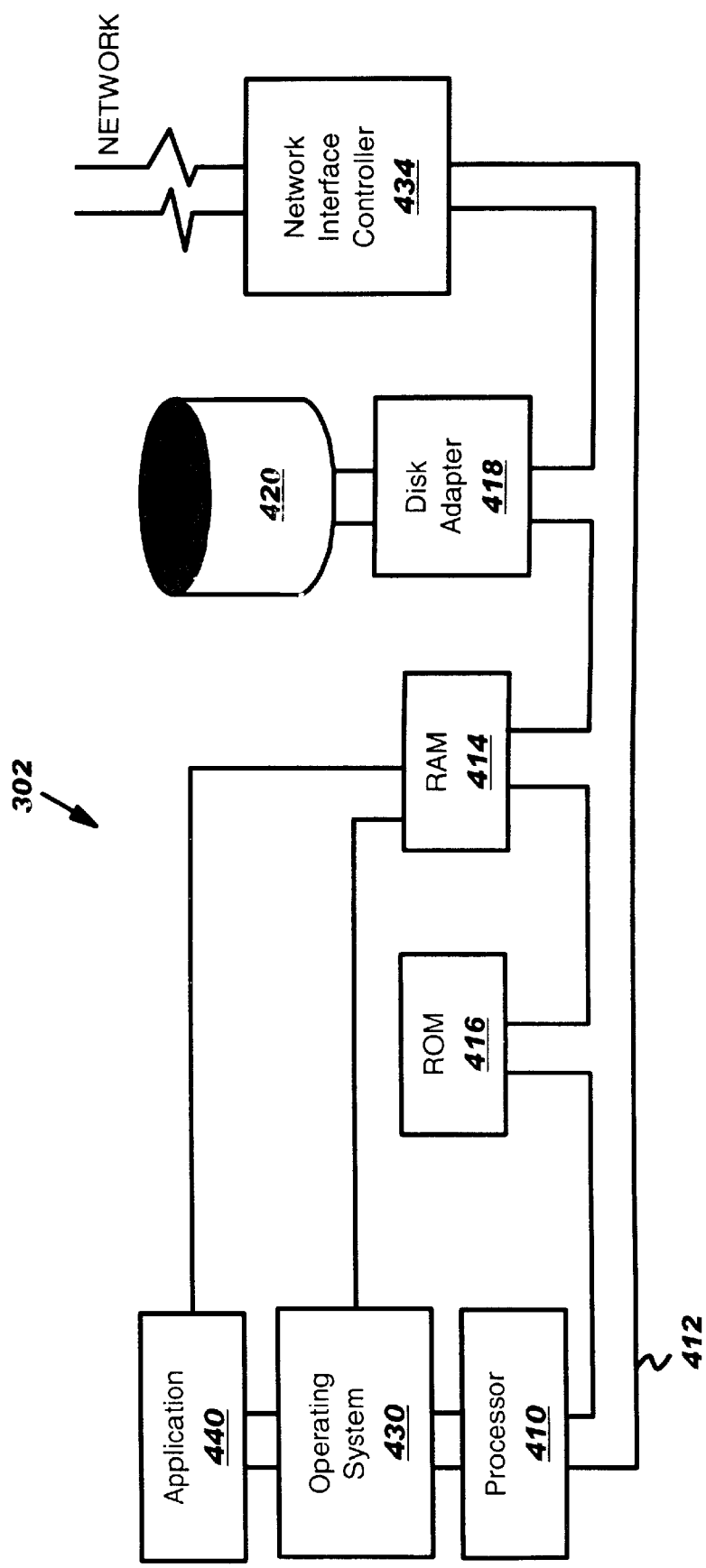
FIG. 4 illustrates an embodiment of the present invention of a server.

FIG. 4 illustrates an embodiment of the present invention of server 302. Referring to FIGS. 3 and 4, one or more clients 301 may issue requests to read from or write to a particular logical drive 304 in an array of logical drives, e.g., RAID. It is noted that the embodiment of the present invention is not limited to read and/or write requests but any requests that require service from server 302. As stated in the Background Information section, these stream of requests may form what is commonly referred to as a workload. That is, a workload may refer to the requests that need to be serviced by server 302. In one embodiment, the workload may be managed by a disk adapter 418. If these requests in the workload may be serviced by a cache (not shown) within memory 414 instead of a particular logical drive in an array of logical drives, e.g., RAID, then the data requested may be accessed faster. Therefore, it is desirable to optimize the cache (not shown) within memory 414 so that as many requests may be serviced by the cache as possible. It is noted that a cache may reside in other locations than memory 414 such as disk adapter 418, disk unit 420, application 440. It is further noted that the cache may be any type of cache including a memory cache, a logical drive cache and a filter cache. A method for adaptively allocating memory, e.g., memory 414, supporting a partitioned cache of multiple logical levels enabling the cache to be adaptive to multiple criteria, e.g., physical characteristics of the system, workload, thereby improving the performance of the cache is described in conjunction with the description of FIGS. 6–13.

Referring to FIG. 4, server 302 may further comprise a processor 410 coupled to various other components by system bus 412. An operating system 430 may run on processor 410 and provide control and coordinate the functions of the various components of FIG. 4. An application 440 in accordance with the principles of the present invention may run in conjunction with operating system 430 and provide calls to operating system 430 where the calls implement the various functions or services to be performed by application 440. Application 440 may include for example, a program for adaptively allocating the memory space in memory 414 to support a partitioned cache of multiple logical levels enabling the cache to be adaptive to multiple criteria, e.g., physical characteristics of the system, workload, thereby improving the performance of the cache, i.e., improving the cache hit rate, as described in conjunction with the description of FIGS. 6–13.

Referring to FIG. 4, read only memory (ROM) 416 may be coupled to system bus 412 and include a basic input/output system ("BIOS") that controls certain basic functions of server 302. Random access memory (RAM) 414, disk adapter 418 and network interface controller 434 may also be coupled to system bus 412. It should be noted that software components including operating system 430 and application 440 may be loaded into RAM 414 which is the computer system's main memory. Disk adapter 418 may be a small computer system interface ("SCSI") adapter that communicates with disk unit 420, e.g., disk drive. It is noted that the program of the present invention that adaptively allocates memory space in memory 414 that supports a partitioned cache of multiple logical levels enabling the cache to be adaptive to multiple criteria, e.g., physical characteristics of the system, workload, thereby improving the performance of the cache as described in the description of FIGS. 6–13 may reside in logical drive adapter 418, disk unit 420 or in application 440. Network Interface controller 434 may interconnect bus 412 with an outside network enabling server 302 to communicate with clients 301 or logical drives 304 via a Local Area Network (LAN), e.g., Ethernet, Token Ring, ARCnet, or a Wide Area Network (WAN), e.g., Internet.

Implementations of the invention include implementations as a computer system programmed to execute the method or methods described herein, and as a computer program product. According to the computer system implementations, sets of instructions for executing the method or methods are resident in the random access memory 414 of one or more computer systems configured generally as described above. Until required by server 302, the set of instructions may be stored as a computer program product in another computer memory, for example, in disk drive 420 (which may include a removable memory such as an optical logical drive or floppy logical drive for eventual use in disk drive 420). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 5:
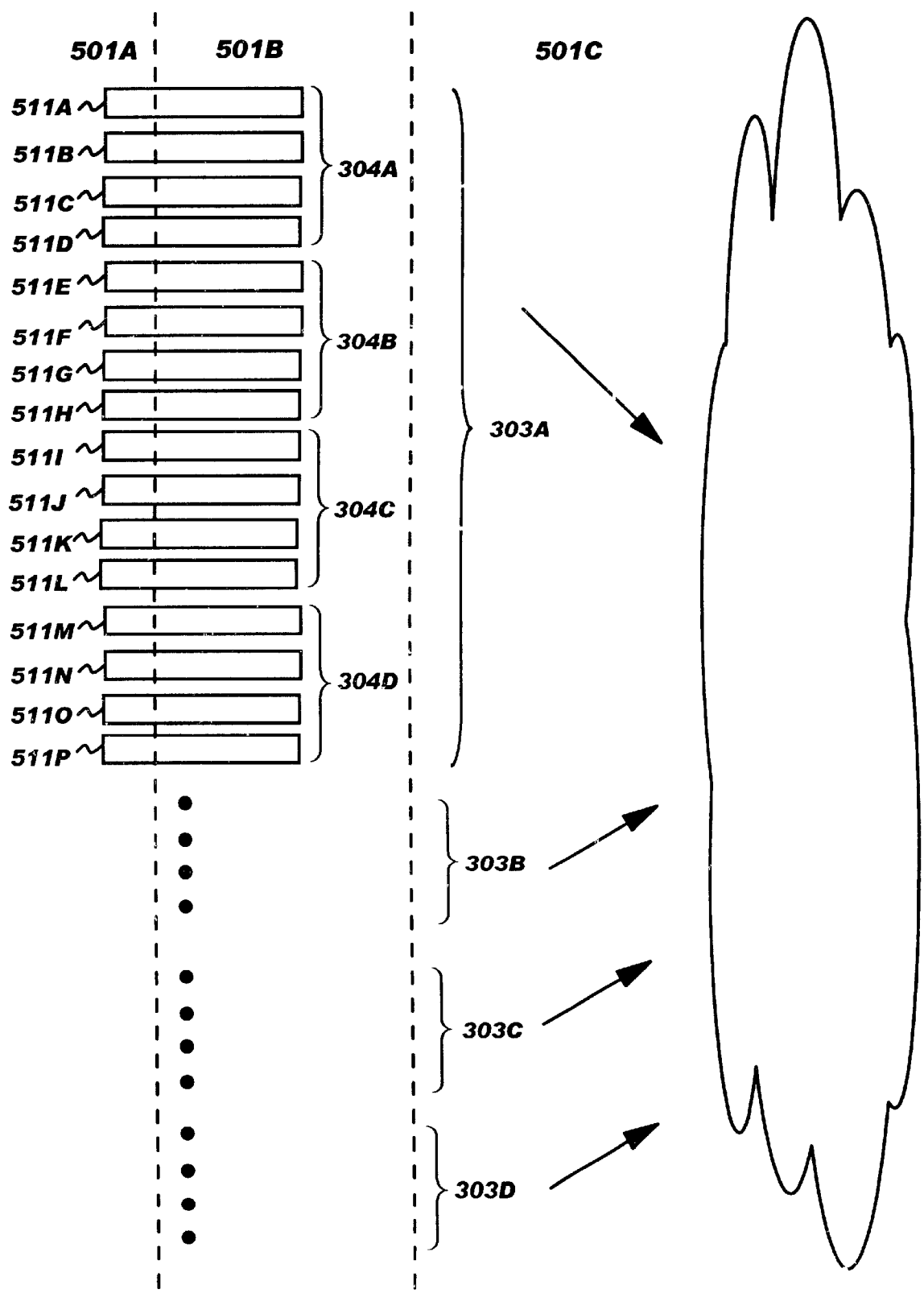
FIG. 5 is a diagram illustrating the multiple logical levels of a partitioned cache in accordance with the present invention.

FIG. 5—Diagram Illustrating Logical Levels of a Partitioned Cache

FIG. 5 is a diagram 500 illustrating logical levels 501A–C of a partitioned cache stored in memory, e.g., memory 414. Logical levels 501A–C may collectively or individually be referred to as logical levels 501 or logical level 501, respectively. It is noted that the partitioned cache may comprise any number of logical levels 501 and that FIG. 5 is illustrative.

As stated above, server 302 (FIG. 4) may be configured to receive requests from one or more clients 301 (FIG. 3) forming a workload. The workload may comprise requests to read from and/or write to a particular Logical Block Address (LBA) in a particular logical drive 304 (FIG. 3). It is noted that the workload may comprise any number of requests. It is further noted that in one embodiment, the workload, i.e., request stream, may be managed by disk adapter 418. It is further noted that the embodiment of the present invention is not limited to read and/or write requests but any requests that require service from server 302.

As stated above, each request may reference a particular LBA in a particular logical drive 304 where each logical drive 304 may store information, e.g., data, within a range of LBA's. Each logical drive 304, e.g., logical drive 304A, may be associated with one or more stacks, e.g., stacks 511A–D, where each stack comprises one or more cache entries configured to store information, e.g., data, requested in logical drive's 304 range of LBA's. For example, logical drive 304A may be associated with stacks 511A–D configured to store information requested in logical drive's 304A range of LBA's. Logical drive 304B may be associated with stacks 511E–H configured to store information requested in logical drive's 304B range of LBA's. Logical drive 304C may be associated with stacks 511I–L configured to store information requested in logical drive's 304C range of LBA's. Logical drive 304D may be associated with stacks 511M–P configured to store information requested in logical drive's 304D range of LBA's. Stacks 511A–P may collectively or individually be referred to as stacks 511 or stack 511, respectively. A detailed description of creating one or more stacks, e.g., stacks 511A–D, associated with a particular logical drive 304, e.g., logical drive 304A, based on frequency count, i.e., the number of times a particular LBA in the particular logical drive 304 has been referenced, is described in detail in U.S. patent application Ser. No. 09/838,607, entitled "Designing a Cache Using a Canonical LRU-LFU Array", which is hereby incorporated herein in its entirety by reference.

Referring to FIG. 5, logical level 501A may represent a first logical level comprising a plurality of partitions associated with a plurality of logical drives 304. A partition may refer to a segment of memory space in memory, e.g., memory 414, configured to store a stack, e.g., stack 511A, comprising one or more cache entries where each cache entry may store information, e.g., data. As stated above, each logical drive 304, e.g., logical drive 304A, may be associated with one or more stacks 511, e.g., stacks 511A–D, configured to store information requested in its LBA. Logical level 501A may comprise one or more stacks 511 associated with each logical drive 304 of FIG. 3. That is, each logical drive 304 of FIG. 3 may be associated with one or more stacks 511.

Referring to FIG. 5, logical level 501B may represent a second logical level comprising a logical grouping of stacks 511 where the logical groupings are associated with adapters 303. As stated above, each adapter 303 may be coupled to one or more logical drives 304. For example, referring to FIG. 3, adapter 303A may be coupled to logical drives 304A–D. Subsequently, a logically grouped stack associated with adapter 303A may comprise a logical grouping of stacks 511A–P. Similarly, adapter 303B may be associated with a logically grouped stack comprising a logical grouping of stacks that are associated with the one more logical drives 304 coupled to adapter 303B. Adapter 303C may be associated with a logically grouped stack comprising a logical grouping of stacks that are associated with the one more logical drives 304 coupled to adapter 303C. Adapter 303D may be associated with a logically grouped stack comprising a logical grouping of stacks that are associated with the one more logical drives 304 coupled to adapter 303D.

Logical level 501C may represent a further logical grouping of the logically grouped stacks associated with each of adapters 303 of FIG. 3. By logically grouping all of the logically grouped stacks associated with each of adapters 303 of FIG. 3, the third logical level may comprise the total number of cache entries available in the partitioned cache stored in memory, e.g., memory 414.

Referring to FIG. 5, partitioned cache may comprise logical levels 501A–C since partitioned cache may be adaptive to three criteria. For example, logical level 501A may represent a partition using frequency count, i.e., the number of times a particular LBA in a particular logical drive 304 has been referenced from the workload. Logical level 501B may represent a partition using the range of LBA's associated with each logical drive 304 associated with a particular adapter 303 coupled to server 302. Logical level 501C may represent a partition using the range of LBA's associated with each adapter 303 coupled to server 102. It is noted that the partitioned cache may be adaptive to any number of criteria and hence the partitioned cache may comprise any number of logical levels.

Figure 6:
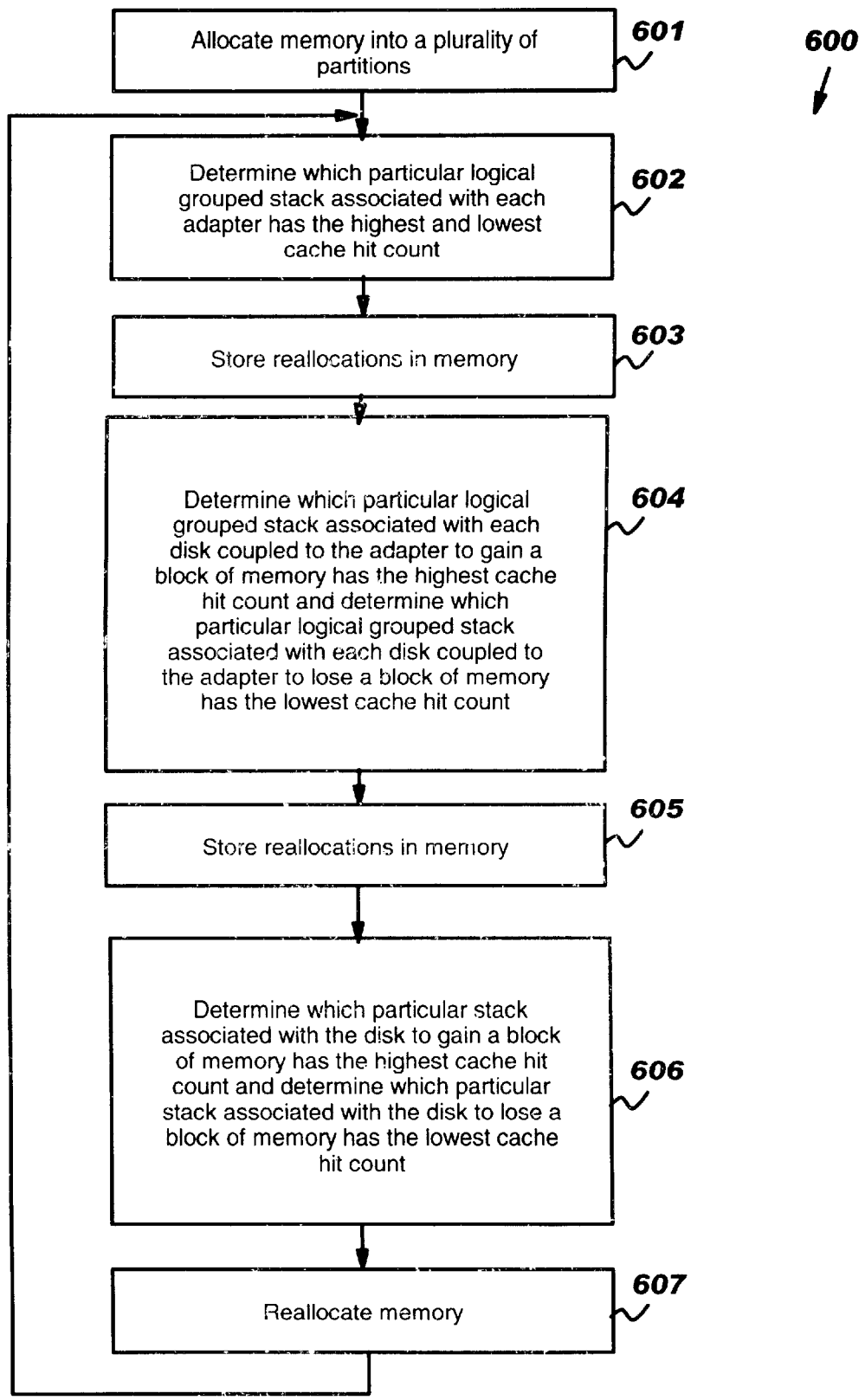
FIG. 6 is a flowchart of a method for adaptively allocating memory supporting a partitioned cache adaptive to multiple criteria in accordance with the present invention.

FIG. 6—Method for Adaptively Allocating Memory Supporting a Partitioned Cache Adaptive to Multiple Criteria FIG. 6 is a flowchart of one embodiment of the present invention of a method 600 for adaptively allocating memory, e.g., memory 414, for supporting a partitioned cache of multiple logical levels enabling the cache to be adaptive to multiple criteria, e.g., physical characteristics of the system, workload, thereby improving the performance of the cache, i.e., improving the cache hit rate. As stated in the Background Information section, prior art methods of designing caches focus on static techniques instead of adaptive techniques. For example, the length of the stacks in these caches do not adapt, i.e., change in size, to changes in the request stream. Consequently, these methods do not efficiently use memory space thereby improving the cache hit rate since the cache is not designed based on adaptive techniques. It would therefore be desirable to develop a cache of multiple logical levels enabling the cache to be adaptive to multiple criteria, e.g., physical characteristics of the system, workload, thereby improving the performance of the cache, i.e., improving the cache hit rate. Method 600 is a method for adaptively allocating memory, e.g., memory 414, for supporting a partitioned cache of multiple logical levels enabling the cache to be adaptive to multiple criteria, e.g., physical characteristics of the system, workload, thereby improving the performance of the cache, i.e., improving the cache hit rate.

In step 601, a portion of memory, e.g., memory 414, may be allocated into a plurality of partitions. As stated above, a partition may refer to a segment of memory space in memory, e.g., memory 414, configured to store a stack, e.g., stack 511A, comprising one or more cache entries where each cache entry may store information, e.g., data. For example, referring to the logical level 501A of FIG. 5, a portion of memory, e.g., memory 414, may be allocated into a plurality of stacks 511 where the plurality of stacks 511 may be associated with a plurality of logical drives 304 (FIG. 3). For example, referring to FIG. 3, stacks 511A–D may be associated with logical drive 304A. That is, stacks 511A–D may comprise cache entries configured to store information, e.g., data, requested in logical drive's 304A range of LBA's. Stacks 511E–F may be associated with logical drive 304B and so forth. Stack 511 may comprise one or more cache entries as illustrated in FIG. 7.

Figure 7:
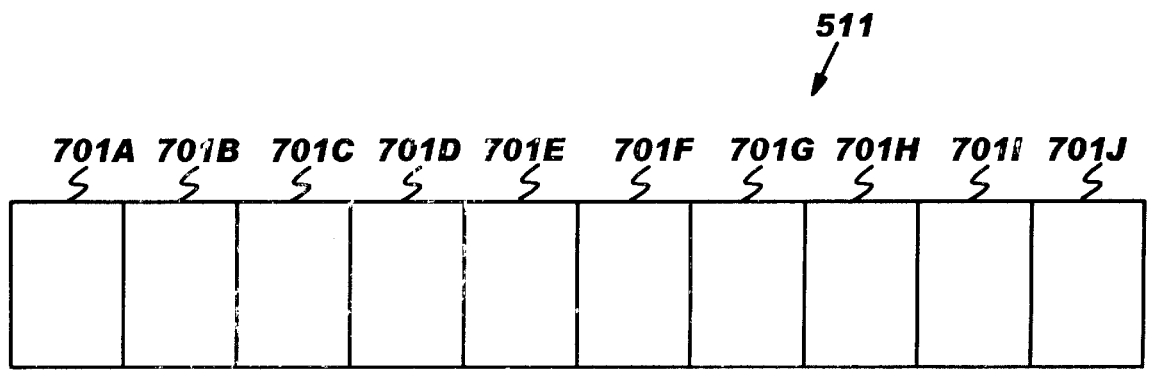
FIG. 7 illustrates an embodiment of a stack configured in accordance with the present invention.

Referring to FIG. 7, stack 511 may comprise one or more cache entries, e.g., cache entries 701A–J. Cache entries 701A–J may collectively or individually be referred to as cache entries 701 or cache entry 701, respectively. It is also noted that cache entry 701 may be referred to herein as a stack position or block of memory. As stated above, each cache entry 701 may store information, e.g., data. As will be explained in greater detail below, the length of stacks 511 may adapt, i.e., change in size, based on multiple criteria such as the workload, the number of adapters 303 and the number of logical drives 304. That is, a portion of memory, e.g., memory 414, allocated for storing the partitioned cache may be reallocated enabling the partitioned cache to be adaptive to multiple criteria, e.g., physical characteristics of the system, workload, thereby improving the performance of the cache, i.e., improving the cache hit rate.

Referring again to FIG. 6, in step 602, a determination may be made as to which logically grouped stack associated with each adapter 303 had the highest hit count and which logically grouped stack associated with each adapter 303 had the lowest hit count during a particular interval of time. Step 602 may comprise sub-steps as illustrated in FIG. 8.

Figure 8:
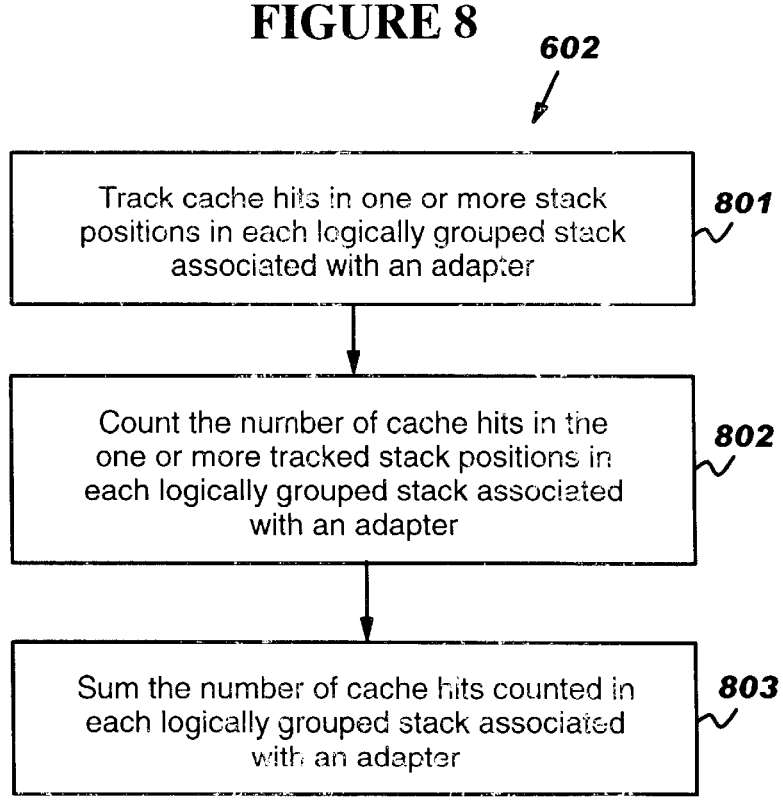
FIG. 8 is a flowchart of the sub-steps for determining which logically grouped stack associated with each adapter has the highest hit count in the one or more stack positions tracked and which logically grouped stack associated with each adapter has the lowest hit count in the one or more stack positions tracked during a particular interval of time in accordance with the present invention.

Referring to FIG. 8, in step 801, the number of cache hits in one or more particular stack positions 701, i.e., cache entries 701, in each logically grouped stack associated with a particular adapter 303 may be tracked. A discussion of the logically grouped stacks associated with each adapter 303 is provided below in conjunction with FIG. 9.

Figure 9:
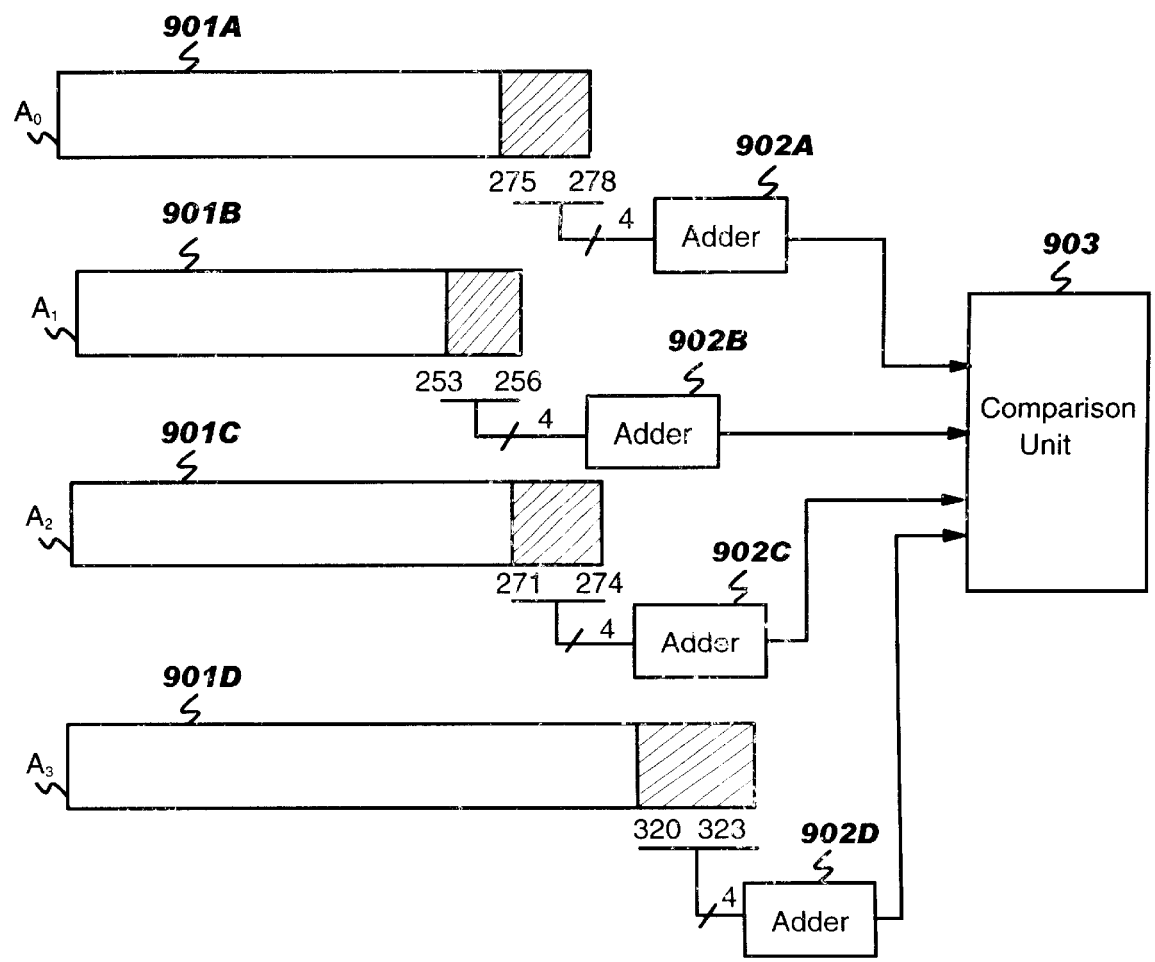
FIG. 9 illustrates an embodiment of the present invention of adaptively allocating blocks of memory among logically grouped stacks associated with adapters.

FIG. 9 illustrates an embodiment of the present invention of adaptively allocating blocks of memory among logically grouped stacks associated with adapters 303. Referring to FIG. 9, adapter 303A, as denoted by $A_0$, may be associated with logically grouped stack 901A which represents a logical grouping of stacks 511A–P. Adapter 303B, as denoted by $A_1$, may be associated with logically grouped stack 901B which represents a logical grouping of stacks that are associated with the one more logical drives 304 coupled to adapter 303B. Adapter 303C, as denoted by $A_2$, may be associated with logically grouped stack 901C which represents a logical grouping of stacks that are associated with the one more logical drives 304 coupled to adapter 303C. Adapter 303D, as denoted by $A_3$, may be associated with logically grouped stack 901D which represents a logical grouping of stacks that are associated with the one more logical drives 304 coupled to adapter 303D. Logically grouped stacks 901A–D may collectively or individually be referred to as logically grouped stacks 901 or logically grouped stack 901, respectively.

As stated above, one or more stack positions in each logically grouped stack 901 associated with an adapter 303 may be tracked. Referring to FIG. 9, stack positions 275–278 in logically grouped stack 901A may be tracked. Stack positions 253–256 in logically grouped stack 901B may be tracked. Stack positions 271–274 in logically grouped stack 901C may be tracked. Stack positions 320–323 in logically grouped stack 901D may be tracked. It is noted that any particular stack position in each particular logically grouped stack 901 may be tracked. However, the number of stack positions tracked in each particular logically grouped stack 901 should be the same. A more detailed explanation of FIG. 9 is provided further below.

Referring to FIGS. 8 and 9, in step 802, the number of cache hits in each of the one or more stack positions tracked in each particular logically grouped stack 901 during a particular interval of time may be counted. Additional explanation of tracking the number of cache hits in each of the or more stack positions tracked in each particular logically grouped stack 901 during a particular interval of time is described in U.S. application Ser. No. 09/838,433, entitled "Designing a Cache with Adaptive Reconfiguration," which is hereby incorporated herein in its entirety by reference.

In one embodiment, the number of cache hits in each stack position in each logically grouped stack 901 may be counted by a particular counter associated with that particular stack position. Each counter associated with a particular stack position may be implemented in software. For example, disk unit 420 or application 450 may comprise software configured to generate a particular counter associated with a particular stack position.

Referring to FIGS. 8 and 9, in step 803, the number of cache hits counted in each of the one or more stack positions tracked in each particular logically grouped stack 901 may be summed. The number of cache hits counted in the one or more stack positions, e.g., last four positions, tracked during a particular interval of time in each particular logically grouped stack 901 may be summed by adders 902A–902D. Adders 902A–D may collectively or individually be referred to as adders 902 or adder 902, respectively. The output of adders 902 is inputted to a comparison unit 903 configured to determine, in step 602, which logically grouped stack 901 had the highest hit count in the one or more stack positions tracked and which logically grouped stack 901 had the lowest hit count in the one or more stack positions tracked during a particular interval of time.

Upon determining which logically grouped stack 901 had the highest hit count in the one or more stack positions tracked and which logically grouped stack 901 had the lowest hit count in the one or more stack positions tracked during a particular interval of time, the memory, e.g., memory 414, allocated for storing logically grouped stack 901 with the highest hit count may gain a block of memory while the memory, e.g., memory 414, allocated for storing logically grouped stack 901 with the lowest hit count may lose a block of memory. For example, if comparison unit 903 determines that logically grouped stack 901A has the highest hit count, then adapter 303A associated with logically grouped stack 901A may gain a block of memory. That is, the memory, e.g., memory 414, allocated for storing logically grouped stack 901A may gain a block of memory. If comparison unit 903 determines that logically grouped stack 901D has the lowest hit count, then adapter 303D associated with logically grouped stack 901D may lose a block of memory. That is, the memory, e.g., memory 414, allocated for storing logically grouped stack 901D may lose a block of memory.

Referring again to FIG. 6, in step 603, these reallocations determined by comparison unit 903 may be stored in memory, e.g., registers in memory 412.

In step 604, a determination may be made as to which logically grouped stack associated with each logical drive 304 coupled to the adapter 303 whose allocated memory, e.g., memory 414, is to gain a block of memory is to gain that block of memory, i.e., which logically grouped stack associated with a logical drive has the highest cache hit count. In step 604, a further determination may be made as to which logically grouped stack associated with each logical drive 304 coupled to the adapter 303 whose allocated memory, e.g., memory 414, is to lose a block of memory is to lose that block of memory, i.e., which logically grouped stack associated with a logical drive has the lowest cache hit count. That is, step 604 as described herein may be executed to determine which logical drive 304 associated with adapter 303 determined to gain a block of memory is to gain that block of memory. Step 604 as described herein may further be executed to determine which logical drive 304 associated with adapter 303 determined to lose a block of memory is to lose that block of memory. It is noted that even though the following discusses step 604 to describe which logical drive 304 associated with adapter 303 determined to gain a block of memory is to gain that block of memory that step 604 may apply to determining which logical drive 304 associated with adapter 303 determined to lose a block of memory is to lose that block of memory. Step 604 may comprise sub-steps as illustrated in FIG. 10.

Figure 10:
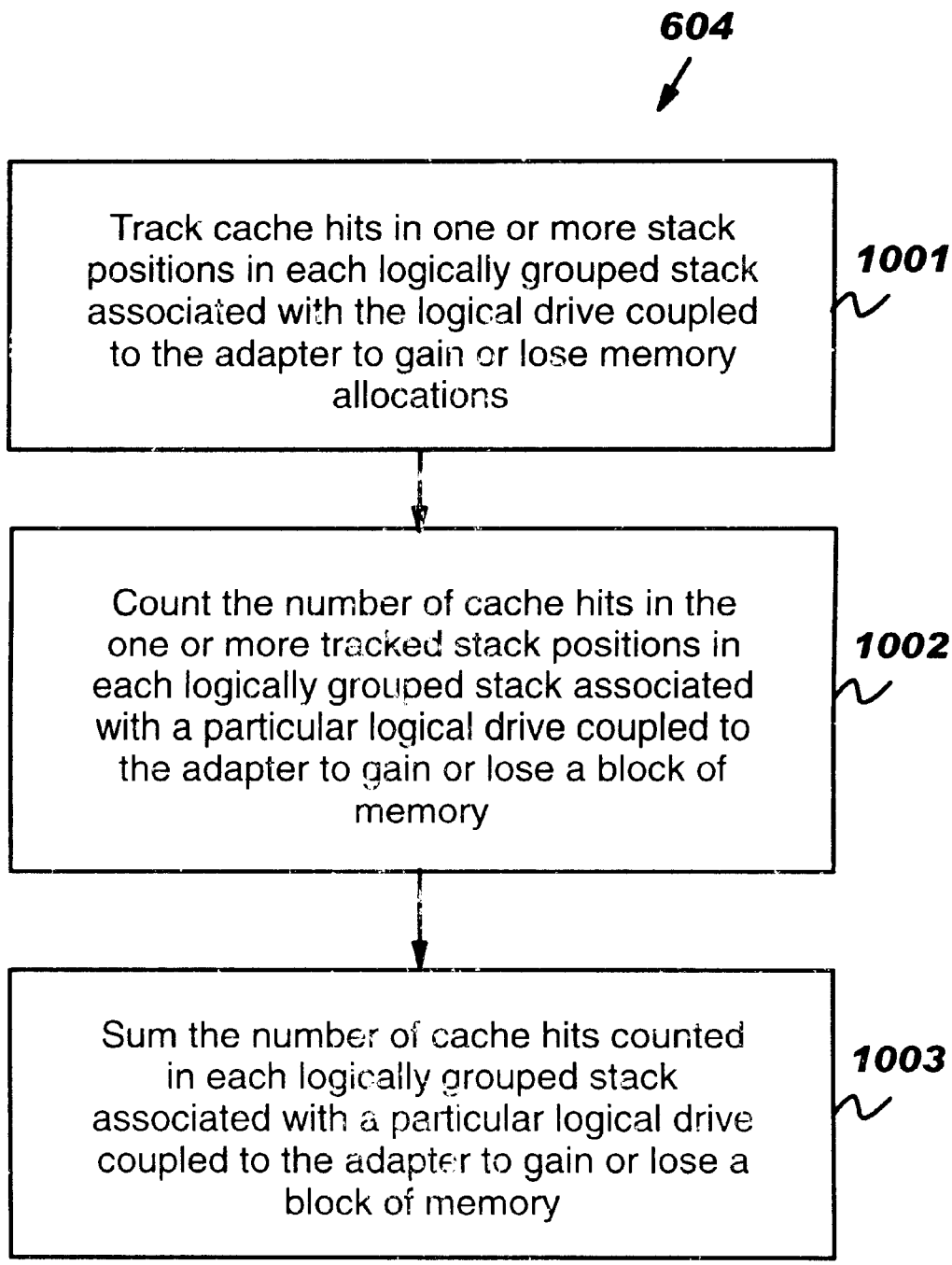
FIG. 10 is a flowchart of the sub-steps for determining which logically grouped stack associated with each logical drive coupled to the adapter to gain a block of memory is to gain that block of memory and which logically grouped stack associated with each logical drive coupled to the adapter to lose a block of memory is to lose that block of memory in accordance with the present invention.

Referring to FIG. 10, in step 1001, the number of cache hits in one or more particular stack positions 701, i.e., cache entries 701, in each logically grouped stack associated with the logical drives 304 that are associated with adapter 303 that was determined to gain or lose memory allocations may be tracked. For example, if comparison unit 903, in step 602, determines that logically grouped stack 901A has the highest hit count, then adapter 303A associated with logically grouped stack 901A may gain a block of memory. If comparison unit 903, in step 602, determines that logically grouped stack 801D has the lowest hit count, then adapter 303D associated with logically grouped stack 801D may lose a block of memory. A discussion of the logically grouped stacks associated with logical drives 304 coupled to a particular adapter 303 to gain or lose a block of memory is provided below in conjunction with FIG. 11.

Figure 11:
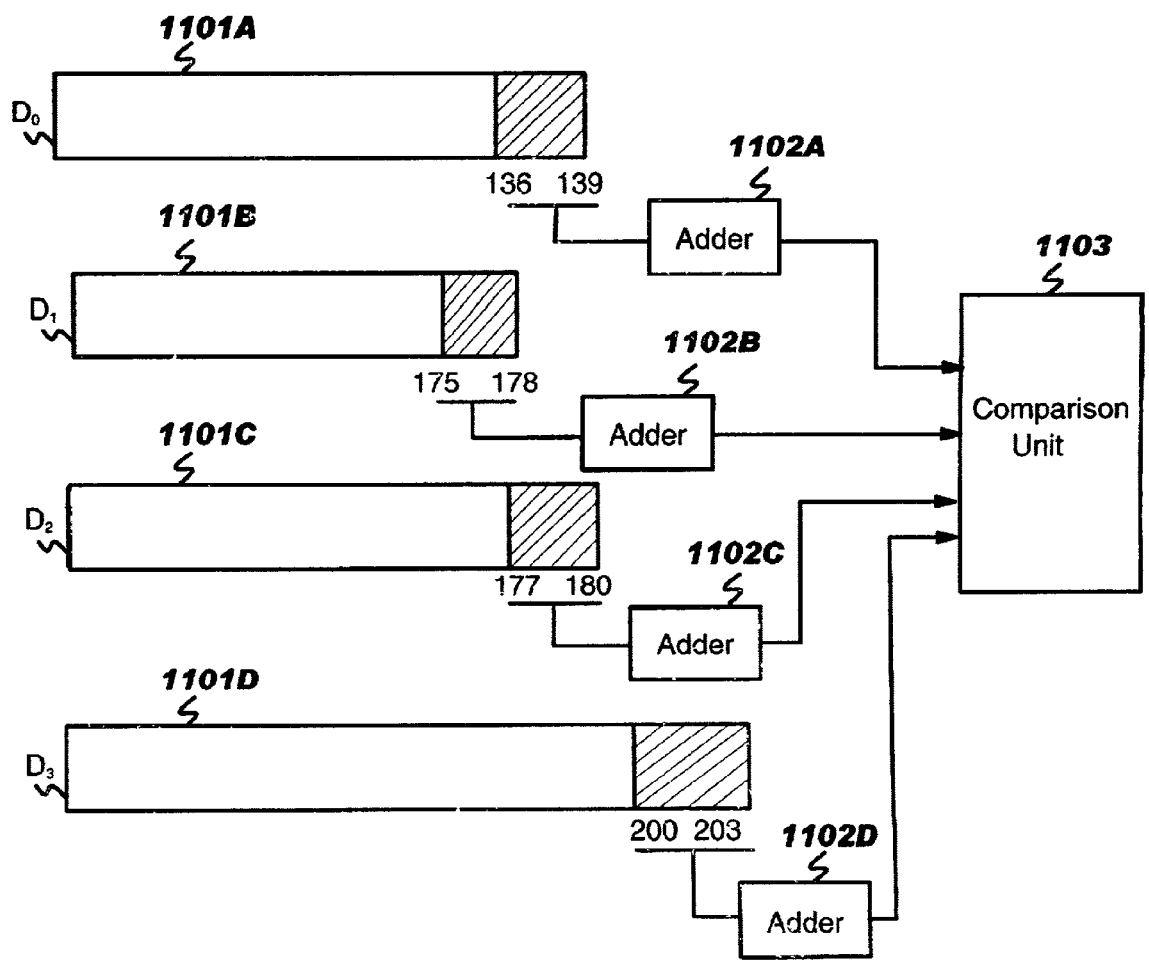
FIG. 11 illustrates an embodiment of the present invention of adaptively allocating blocks of memory among logically grouped stacks associated with logical drives of a particular adapter to gain or lose a block of memory.

FIG. 11 illustrates an embodiment of the present invention of adaptively allocating blocks of memory among logically grouped stacks associated with logical drives 304 of a particular adapter 303 to gain or lose a block of memory. For example, if comparison unit 903, in step 602, determines that logically grouped stack 901A has the highest hit count, then adapter 303A associated with logically grouped stack 901A may gain a block of memory. FIG. 11 illustrates which logically grouped stack associated with a particular logical drive 304 coupled to adapter 303A is to gain that block of memory.

Referring to FIG. 11, logical drive 304A, as indicated by $D_0$, may be associated with logically grouped stack 1101A which represents a logical grouping of stacks 511A–D. Logical drive 304B, as denoted by $D_1$, may be associated with logically grouped stack 1101B which represents a grouping of stacks 511E–H that are associated with logical drive 304B coupled to adapter 303A. Logical drive 304C, as denoted by $D_2$, may be associated with logically grouped stack 1101C which represents a logical grouping of stacks 511I–L that are associated with logical drive 304C coupled to adapter 303A. Logical drive 304D, as denoted by $D_3$, may be associated with logically grouped stack 1101D which represents a grouping of stacks 511M–P that are associated with logical drive 304D coupled to adapter 303A. Logically grouped stacks 1101A–D may collectively or individually be referred to as logically grouped stacks 1101 or logically grouped stack 1101, respectively.

As stated above, one or more stack positions in each logically grouped stack 1101 associated with a particular logical drive 304 coupled to a particular adapter 303 may be tracked. Referring to FIG. 11, stack positions 136–139 in logically grouped stack 1101A may be tracked. Stack positions 175–178 in logically grouped stack 1101B may be tracked. Stack positions 177–180 in logically grouped stack 1101C may be tracked. Stack positions 200–203 in logically grouped stack 1101D may be tracked. It is noted that any particular stack position in each particular logically grouped stack 1101 may be tracked. However, the number of stack positions tracked in each particular logically grouped stack 1101 should be the same. A more detailed explanation of FIG. 11 is provided further below.

Referring to FIG. 10, in step 1002, the number of cache hits in each of the one or more stack positions tracked in each particular logically grouped stack 1101 during a particular interval of time may be counted. As stated above, additional explanation of tracking the number of cache hits in each of the or more stack positions tracked in each particular logically grouped stack 1101 during a particular interval of time is described in U.S. application Ser. No. 09/838,433, entitled "Designing a Cache with Adaptive Reconfiguration," which is hereby incorporated herein in its entirety by reference.

In one embodiment, the number of cache hits in each stack position in each logically grouped stack 1101 may be counted by a particular counter associated with that particular stack position. Each counter associated with a particular stack position may be implemented in software. For example, disk unit 420 or application 450 may comprise software configured to generate a particular counter associated with a particular stack position.

Referring to FIGS. 10 and 11, in step 1003, the number of cache hits counted in each of the one or more stack positions tracked in each particular stack 901 may be summed as illustrated in FIG. 11. The number of cache hits counted in the one or more stack positions, e.g., last four positions, tracked during a particular interval of time in each particular logically grouped stack 1101 may be summed by adders 1102A–1102D. Adders 1102A–D may collectively or individually be referred to as adders 1102 or adder 1102, respectively. The output of adders 1102 is inputted to a comparison unit 1103 configured to determine, in step 604, which logically grouped stack 1101 had the highest hit count in the one or more stack positions tracked during a particular interval of time.

Returning to FIG. 6, upon determining which logically grouped stack 1101 had the highest hit count in the one or more stack positions tracked during a particular interval of time, the memory, e.g., memory 414, allocated for storing logically grouped stack 1101 with the highest hit count may gain a block of memory. In step 605, this reallocation determined by comparison unit 1103 may be stored in memory, e.g., registers in memory 412.

In step 606, a determination may be made as to which stack 511 associated with the logical drive 304 determined to gain a block of memory is to gain that block of memory, i.e., which logically grouped stack associated with a logical drive has the highest cache hit count. In step 606, a further determination may be made as to which stack 511 associated with the logical drive 304 determined to lose a block of memory is to lose that block of memory, i.e., which logically grouped stack associated with a logical drive has the lowest cache hit count. That is, step 606 as described herein may be executed to determine which stack 511 of logical drive 304 determined to gain a block of memory is to gain that block of memory. Steps 606 as described herein may further be executed to determine which stack 511 of logical drive 304 determined to lose a block of memory is to lose that block of memory. It is noted that even though the following discusses step 606 to describe which stack 511 of logical drive 304 determined to gain a block of memory is to gain that block of memory that step 606 may apply to determining which stack 511 of logical drive 304 determined to lose a block of memory is to lose that block of memory. Step 606 may comprise sub-steps as illustrated in FIG. 12.

Figure 12:
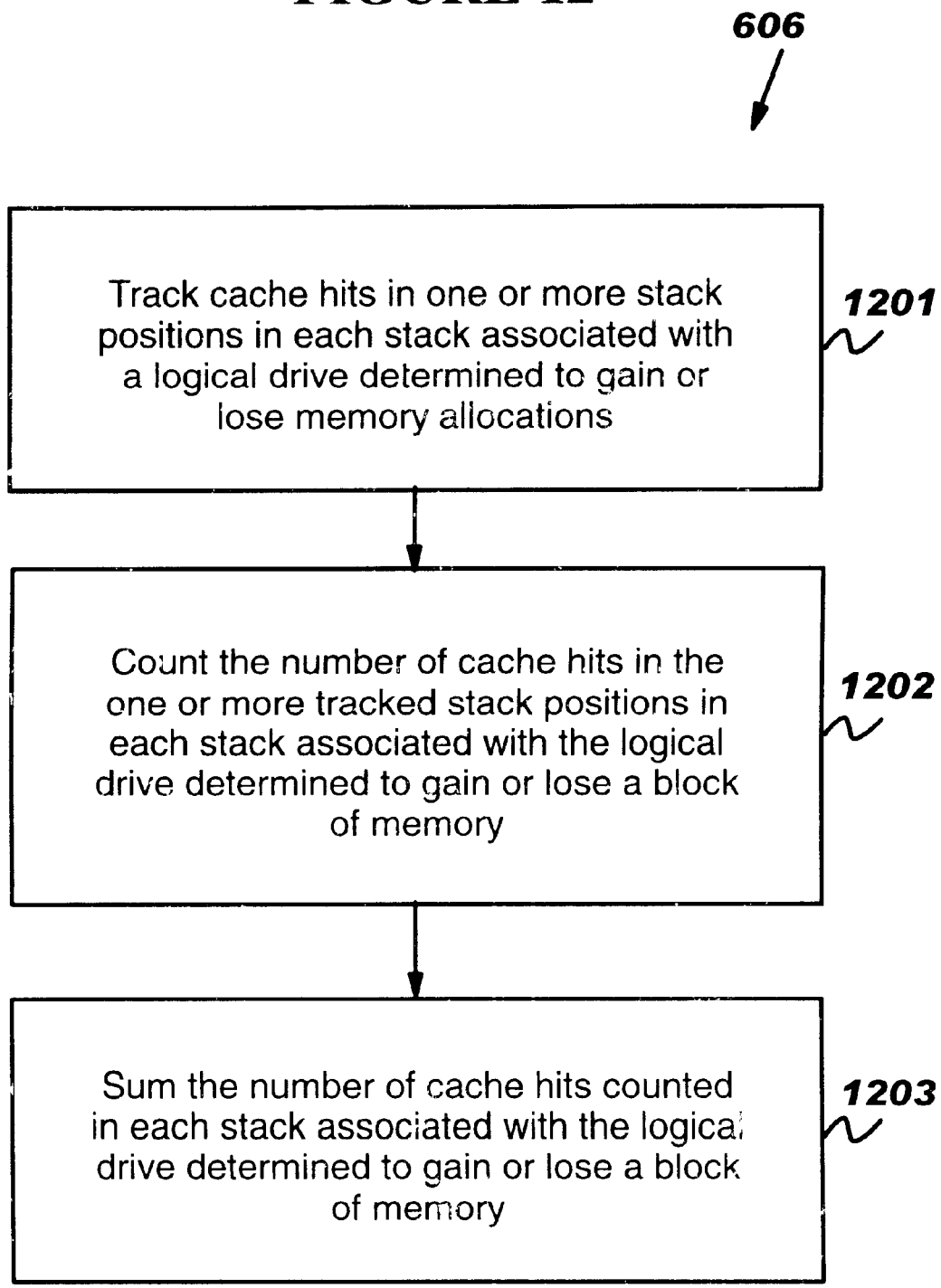
FIG. 12 is a flowchart of the sub-steps for determining which stack associated with the logical drive to gain a block of memory is to gain that block of memory and which stack associated with the logical drive to lose a block of memory is to lose that block of memory in accordance with the present invention.

Referring to FIG. 12, the number of cache hits in one or more particular stack positions 701, i.e., cache entries 701, in each stack associated with the logical drive 304 determined to gain allocations may be tracked in step 1201. For example, if comparison unit 1103, in step 604, determines that logically grouped stack 1101A has the highest hit count, then the memory, e.g., memory 414, allocated for storing stacks 511 of logical drive 304A associated with stack 101A may gain a block of memory.

As stated above, each logical drive 304, e.g., 304A, may be associated with one or more stacks 511. For example, logical drive 304A may be associated with stacks 511A–D as illustrated in FIG. 13.

Figure 13:
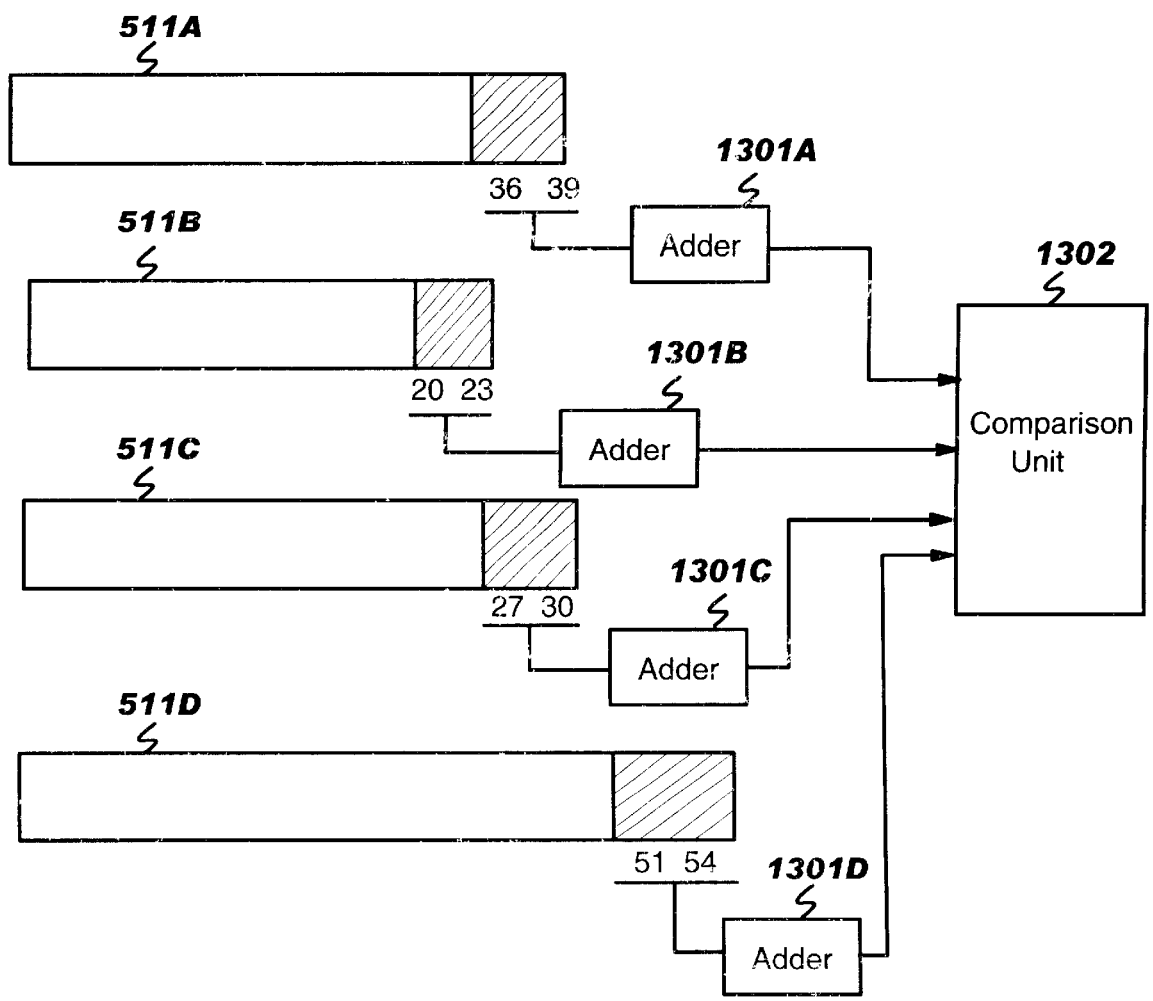
FIG. 13 illustrates an embodiment of the present invention of adaptively allocating blocks of memory among stacks associated with a particular logical drive to gain or lose a block of memory.

FIG. 13 illustrates an embodiment of the present invention of adaptively allocating blocks of memory among stacks associated with a particular logical drive 304 to gain or lose a block of memory. For example, if comparison unit 1103, in step 604, determines that logically grouped stack 1101A has the highest hit count, then logical drive 304A associated with logically grouped stack 1101A may gain a block of memory. FIG. 13 illustrates which stack 511, e.g., stacks 511A–D, associated with logical drive 304A is to gain the block of memory.

As stated above, one or more stack positions in each stack 511, e.g., stacks 511A–D, associated with logical drive 304A may be tracked. Referring to FIG. 10, stack positions 36–39 in stack 511A may be tracked. Stack positions 20–23 in stack 511B may be tracked. Stack positions 27–30 in stack 511C may be tracked. Stack positions 51–54 in stack 511D may be tracked. It is noted that any particular stack position in each particular stack 511 may be tracked. However, the number of stack positions tracked in each particular stack 511 should be the same. A more detailed explanation of FIG. 13 is provided further below.

Referring to FIG. 13, in step 1302, the number of cache hits in each of the one or more stack positions tracked in each particular stack 511, e.g., stacks 511A–D, during a particular interval of time may be counted. As stated above, additional explanation of tracking the number of cache hits in each of the or more stack positions tracked in each particular stack 511, e.g., stacks 511A–D, during a particular interval of time is described in U.S. application Ser. No. 09/838,433, entitled "Designing a Cache with Adaptive Reconfiguration," which is hereby incorporated herein in its entirety by reference.

In one embodiment, the number of cache hits in each stack position in each stack 511, e.g., stacks 511A–D, may be counted by a particular counter associated with that particular stack position. Each counter associated with a particular stack position may be implemented in software. For example, disk unit 420 or application 450 may comprise software configured to generate a particular counter associated with a particular stack position.

Referring to FIGS. 12 and 13, in step 1203, the number of cache hits counted in each of the one or more stack positions tracked in each particular stack 511, e.g., stacks 511A–D, may be summed as illustrated in FIG. 13. The number of cache hits counted in the one or more stack positions, e.g., last four positions, tracked during a particular interval of time in each particular stack 511, e.g., stacks 511A–D, may be summed by adders 1301A–1301D. Adders 1301A–D may collectively or individually be referred to as adders 1301 or adder 1301, respectively. The output of adders 1301 is inputted to a comparison unit 1302 configured to determine, in step 606, which stack 511, e.g., stacks 511A–D, had the highest hit count in the one or more stack positions tracked during a particular period of time.

Upon determining which stack 511, e.g., stacks 511A–D, had the highest hit count in the one or more stack positions tracked during a particular interval of time, the memory, e.g., memory 414, allocated for storing stack 511, e.g., stacks 511A–D, with the highest hit count may gain a block of memory. In step 607, memory, e.g., memory 414, may be reallocated accordingly. That is, memory, e.g., memory 414, may adaptively reallocate such as by allocating an additional block of memory for stack 511 with the highest count. Memory, e.g., memory 414, may also adaptively reallocate such as by eliminating a block of memory for stack 511 with the lowest hit count associated with logical drive 304 coupled to adapter 303 to lose a block of memory.

Upon reallocating the memory, e.g., memory 414, storing the partitioned cache, the memory, e.g., memory 414, may be further reallocated by repeating steps 602–607.

It is noted that method 600 may be executed in a different order presented and that the order presented in the discussion of FIGS. 6–13 is illustrative. It is further noted that certain steps may be executed almost concurrently.

Although the system, computer program product and method are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A method for reallocating memory space for storing a partitioned cache comprising the steps of:

storing a first plurality of stacks in memory, wherein each stack comprises one or more stack positions storing one or more cache entries, wherein said first plurality of stacks is logically grouped into a second plurality of stacks, wherein each of said second plurality of stacks comprises one or more of said first plurality of stacks;

determining which of said one or more stacks of said second plurality of stacks has a highest hit count and which of said one or more stacks of said second plurality of stacks has a lowest hit count;

determining which of said one or more stacks of said first plurality of stacks associated with said stack of said second plurality of stacks having said highest hit count has a highest hit count;

determining which of said one or more stacks of said first plurality of stacks associated with said stack of said second plurality of stacks having said lowest hit count has a lowest hit count; and reallocating memory space of said memory by adding a block of memory to said stack of said first plurality of stacks that has said highest hit count and eliminating a block of memory to said stack of said first plurality of stacks that has said lowest hit count.

2. The method as recited in claim 1, wherein said step of determining which of said one or more stacks of said first plurality of stacks associated with said stack of said second plurality of stacks having said highest hit count that has said highest hit count comprises the steps of:

tracking a number of cache hits in one or more stacks positions in one or more stacks of said first plurality of stacks associated with said stack of said second plurality of stacks having said highest hit count;

counting said number of cache hits in one or more stacks positions in one or more stacks of said first plurality of stacks associated with said stack of said second plurality of stacks having said highest hit count; and summing said number of cache hits counted in one or more stacks positions in one or more stacks of said first plurality of stacks associated with said stack of said second plurality of stacks having said highest hit count.

3. The method as recited in claim 1, wherein said step of determining which of said one or more stacks of said first plurality of stacks associated with said stack of said second plurality of stacks having said highest hit count has said lowest hit count comprises the steps of:

tracking a number of cache hits in one or more stacks positions in one or more stacks of said first plurality of stacks associated with said stack of said second plurality of stacks having said lowest hit count;

counting said number of cache hits in one or more stacks positions in one or more stacks of said first plurality of stacks associated with said stack of said second plurality of stacks having said lowest hit count; and summing said number of cache hits counted in one or more stacks positions in one or more stacks of said first plurality of stacks associated with said stack of said second plurality of stacks having said lowest hit count.

4. The method as recited in claim 1, wherein said second plurality of stacks is logically grouped into a third plurality of stacks, wherein each of said third plurality of stacks comprises one or more of said second plurality of stacks.

5. The method as recited in claim 4 further comprising the steps of:
   tracking a number of cache hits in one or more stack positions in each of said third plurality of stacks; and
   determining which of said third plurality of stacks has a highest hit count and which of said third plurality of stacks has a lowest hit count.

6. The method as recited in claim 5 further comprising the steps of:
   determining which of said one or more stacks of said second plurality of stacks associated with said stack of said third plurality of stacks having said highest hit count has a highest hit count; and
   determining which of said one or more stacks of said second plurality of stacks associated with said stack of said third plurality of stacks having said lowest hit count has a lowest hit count.

7. The method as recited in claim 4, wherein said reallocation of said memory space of said memory is based on a first, a second and a third criteria, wherein said first criteria is associated with said first plurality of stacks, wherein said second criteria is associated with said second plurality of stacks, wherein said third criteria is associated with said third plurality of stacks.

8. The method as recited in claim 7, wherein said first criteria is based on a workload, wherein said second criteria and said third criteria are based on a first physical characteristic and a second physical characteristic, respectively, of a system.

9. A computer program product embodied in a machine readable medium for reallocating memory space for storing a partitioned cache comprising the programming steps of:
   storing a first plurality of stacks in memory, wherein each stack comprises one or more stack positions storing one or more cache entries, wherein said first plurality of stacks is logically grouped into a second plurality of stacks, wherein each of said second plurality of stacks comprises one or more of said first plurality of stacks;
   determining which of said one or more stacks of said second plurality of stacks has a highest hit count and which of said one or more stacks of said second plurality of stacks has a lowest hit count;
   determining which of said one or more stacks of said first plurality of stacks associated with said stack of said second plurality of stacks having said highest hit count has a highest hit count;
   determining which of said one or more stacks of said first plurality of stacks associated with said stack of said second plurality of stacks having said lowest hit count has a lowest hit count; and
   reallocating memory space of said memory by adding a block of memory to said stack of said first plurality of stacks that has said highest hit count and eliminating a block of memory to said stack of said first plurality of stacks that has said lowest hit count.

10. The computer program product as recited in claim 9, wherein said programming step of determining which of said one or more stacks of said first plurality of stacks associated with said stack of said second plurality of stacks having said highest hit count that has said highest hit count comprises the programming steps of:
   tracking a number of cache hits in one or more stacks positions in one or more stacks of said first plurality of stacks associated with said stack of said second plurality of stacks having said highest hit count;
   counting said number of cache hits in one or more stacks positions in one or more stacks of said first plurality of stacks associated with said stack of said second plurality of stacks having said highest hit count; and
   summing said number of cache hits counted in one or more stacks positions in one or more stacks of said first plurality of stacks associated with said stack of said second plurality of stacks having said highest hit count.

11. The computer program product as recited in claim 9, wherein said programming step of determining which of said one or more stacks of said first plurality of stacks associated with said stack of said second plurality of stacks having said highest hit count has said lowest hit count comprises the programming steps of:
   tracking a number of cache hits in one or more stacks positions in one or more stacks of said first plurality of stacks associated with said stack of said second plurality of stacks having said lowest hit count;
   counting said number of cache hits in one or more stacks positions in one or more stacks of said first plurality of stacks associated with said stack of said second plurality of stacks having said lowest hit count; and
   summing said number of cache hits counted in one or more stacks positions in one or more stacks of said first plurality of stacks associated with said stack of said second plurality of stacks having said lowest hit count.

12. The computer program product as recited in claim 9, wherein said second plurality of stacks is logically grouped into a third plurality of stacks, wherein each of said third plurality of stacks comprises one or more of said second plurality of stacks.

13. The computer program product as recited in claim 12 further comprises the programming steps of:
   tracking a number of cache hits in one or more stack positions in each of said third plurality of stacks; and
   determining which of said third plurality of stacks has a highest hit count and which of said third plurality of stacks has a lowest hit count.

14. The computer program product as recited in claim 13 further comprises the programming steps of:
   determining which of said one or more stacks of said second plurality of stacks associated with said stack of said third plurality of stacks having said highest hit count has a highest hit count; and
   determining which of said one or more stacks of said second plurality of stacks associated with said stack of said third plurality of stacks having said lowest hit count has a lowest hit count.

15. The computer program product as recited in claim 12, wherein said reallocation of said memory space of said memory is based on a first, a second and a third criteria, wherein said first criteria is associated with said first plurality of stacks, wherein said second criteria is associated with said second plurality of stacks, wherein said third criteria is associated with said third plurality of stacks.

16. The computer program product as recited in claim 15, wherein said first criteria is based on a workload, wherein said second criteria and said third criteria are based on a first physical characteristic and a second physical characteristic, respectively, of a system.

17. A system, comprising:
   a memory unit operable for storing a computer program operable for reallocating memory space for storing a partitioned cache; and a processor coupled to said memory unit, wherein said processor, responsive to said computer program, comprises:

circuitry operable for storing a first plurality of stacks in memory, wherein each stack comprises one or more stack positions storing one or more cache entries, wherein said first plurality of stacks is logically grouped into a second plurality of stacks, wherein each of said second plurality of stacks comprises one or more of said first plurality of stacks;

circuitry operable for determining which of said one or more stacks of said second plurality of stacks has a highest hit count and which of said one or more stacks of said second plurality of stacks has a lowest hit count;

circuitry operable for determining which of said one or more stacks of said first plurality of stacks associated with said stack of said second plurality of stacks having said highest hit count has a highest hit count;

circuitry operable for determining which of said one or more stacks of said first plurality of stacks associated with said stack of said second plurality of stacks having said lowest hit count has a lowest hit count; and circuitry operable for reallocating memory space of said memory by adding a block of memory to said stack of said first plurality of stacks that has said highest hit count and eliminating a block of memory to said stack of said first plurality of stacks that has said lowest hit count.

18. The system as recited in claim 17, wherein said circuitry operable for determining which of said one or more stacks of said first plurality of stacks associated with said stack of said second plurality of stacks having said highest hit count that has said highest hit count comprises:

circuitry operable for tracking a number of cache hits in one or more stacks positions in one or more stacks of said first plurality of stacks associated with said stack of said second plurality of stacks having said highest hit count;

circuitry operable for counting said number of cache hits in one or more stacks positions in one or more stacks of said first plurality of stacks associated with said stack of said second plurality of stacks having said highest hit count; and circuitry operable for summing said number of cache hits counted in one or more stacks positions in one or more stacks of said first plurality of stacks associated with said stack of said second plurality of stacks having said highest hit count.

19. The system as recited in claim 17, wherein said circuitry operable for determining which of said one or more stacks of said first plurality of stacks associated with said stack of said second plurality of stacks having said highest hit count has said lowest hit count comprises:

circuitry operable for tracking a number of cache hits in one or more stacks positions in one or more stacks of said first plurality of stacks associated with said stack of said second plurality of stacks having said lowest hit count;

circuitry operable for counting said number of cache hits in one or more stacks positions in one or more stacks of said first plurality of stacks associated with said stack of said second plurality of stacks having said lowest hit count; and circuitry operable for summing said number of cache hits counted in one or more stacks positions in one or more stacks of said first plurality of stacks associated with said stack of said second plurality of stacks having said lowest hit count.

20. The system as recited in claim 17, wherein said second plurality of stacks is logically grouped into a third plurality of stacks, wherein each of said third plurality of stacks comprises one or more of said second plurality of stacks.

21. The system as recited in claim 20, wherein said processor further comprises:

circuitry operable for tracking a number of cache hits in one or more stack positions in each of said third plurality of stacks; and circuitry operable for determining which of said third plurality of stacks has a highest hit count and which of said third plurality of stacks has a lowest hit count.

22. The system as recited in claim 21, wherein said processor further comprises:

circuitry operable for determining which of said one or more stacks of said second plurality of stacks associated with said stack of said third plurality of stacks having said highest hit count has a highest hit count; and circuitry operable for determining which of said one or more stacks of said second plurality of stacks associated with said stack of said third plurality of stacks having said lowest hit count has a lowest hit count.

23. The system as recited in claim 20, wherein said reallocation of said memory space of said memory is based on a first, a second and a third criteria, wherein said first criteria is associated with said first plurality of stacks, wherein said second criteria is associated with said second plurality of stacks, wherein said third criteria is associated with said third plurality of stacks.

24. The system as recited in claim 23, wherein said first criteria is based on a workload, wherein said second criteria and said third criteria are based on a first physical characteristic and a second physical characteristic, respectively, of a system.

* * * * *